(12) United States Patent
Chien et al.

(10) Patent No.: US 6,501,539 B2
(45) Date of Patent: Dec. 31, 2002

(54) HIGH PRECISION LASER RANGE FINDER WITH AN AUTOMATIC PEAK CONTROL LOOP

(75) Inventors: Pie-Yau Chien, Taiwan (TW); Te-Wei Liu, Taiwan (TW); Jui-Feng Huang, Taiwan (TW); Chih-Wei Hung, Taiwan (TW); Chih-Hsiang Lin, Taiwan (TW); Hua-Tang Liu, Taiwan (TW)

(73) Assignee: Asia Optical Co., Inc., T.E.P.E. (TW)

( * ) Notice: Subject to any disclaimer, the term of this patent is extended or adjusted under 35 U.S.C. 154(b) by 0 days.

(21) Appl. No.: 09/810,906

(22) Filed: Mar. 15, 2001

(65) Prior Publication Data

US 2002/0131034 A1 Sep. 19, 2002

(51) Int. Cl.[7] ................................................ G01C 3/08
(52) U.S. Cl. ....................................... 356/5.01; 356/5.08
(58) Field of Search ................................ 356/5.01–5.08

(56) References Cited

U.S. PATENT DOCUMENTS

| | | | |
|---|---|---|---|
| 4,259,592 A | * | 3/1981 | Frungel et al. |
| 4,825,091 A | * | 4/1989 | Breyer et al. |
| 5,880,821 A | * | 3/1999 | Dunne ........................ 356/5.05 |
| 5,926,259 A | * | 7/1999 | Bamberger et al. ........ 356/5.01 |
| 6,310,682 B1 | * | 10/2001 | Gavish et al. ............. 356/5.01 |

* cited by examiner

Primary Examiner—Stephen C. Buczinski
(74) Attorney, Agent, or Firm—Kolisch Hartwell, P.C.

(57) ABSTRACT

A high precision laser range finder comprises an APC loop for eliminating a timing jitter problem due to different reflections on a target. The APC loop comprises a laser receiver, a peak holding circuit, an integrator and a high voltage generator. The peak holding circuit is connected with the laser receiver for detecting a signal strength outputted from the laser receiver. The high voltage generator provides the laser driver and laser receiver with voltage so as to control the strength of the emitted laser pulse signal of the laser driver and the gain of the avalanche photo-detector. The integrator is used to eliminate the steady error in the APC loop. Furthermore, a time to amplitude converting circuit comprises an AJD converter for obtaining a distance data and then filtering in a microprocessor to increase the measurement accuracy.

8 Claims, 12 Drawing Sheets

HIGH PRECISION LASER RANGE FINDER WITH AN AUTOMATIC PEAK CONTROL LOOP

BACKGROUND OF THE INVENTION

1. Field of the Invention

The present invention relates to a laser range finder, and more particularly to a high precision laser range finder with an automatic peak control (APC) loop for increasing the measuring precision.

2. Description of Related Art

A laser range finder is one of the most important devices for measuring distances. Conventionally, the laser range finder employs a pulse type of a laser transmitter to transmit short laser pulse signals onto a target. A reflected laser signal from the target is received by a laser receiver to evaluate the distance, wherein the laser receiver must be a low noise, high sensitivity device. The distance between the target and the laser range finder is obtained by using the formula (I) shown below.

$$T_d = 2L/C \quad (I)$$

where L represents the distance, C represents the speed of light, and $T_d$ is a delay time between the firing laser pulse signal and the received laser pulse signal that is reflected from the target. A precise distance can be obtained by precisely measuring $T_d$ according to formula (I). In order to precisely measure the time delay $T_d$, there are several functions of the laser range finder which need to be improved. These improvements are shown as following:

1. The transmitted laser pulse signal needs to be limited to as narrow as possible.
2. The received laser pulse signal from the target need to be stabilized, thus the fluctuation of timing start point in the received laser pulse signal caused by the different reflectivity of the target is kept at minimum.
3. A high sensitivity time delay measurement circuit is needed to improve the resolution of distance measurement.

In U.S. Pat. No. 3,921,095, a startable phase-locked loop technique is used to improve the delay time measurement resolution to picosecond order. In this patent, a startable oscillator is provided. The frequency of the startable oscillator can be locked to be a reference frequency whose initial phase at the instant of starting the startable oscillator is able to be maintained with a known precision. However, the startable oscillator is only workable in a high speed clock, especially in an ECL logic gate, thus the power consumption of this circuit is a main problem in a battery powered product.

In U.S. Pat. No. 5,075,878, a sampling circuit is used to improve the delay time measurement. In this patent, a more accurate delay time is derived through using a reference signal sampled in correlation to the fired laser pulse signal and the received laser pulse signal. The reference signal is used to derive a sampled waveform signal that has a period which is long relative to the fired and received laser pulse signal. However, in this patent, a distortion problem may occur in the sampling circuit, and consequently a measurement error may also occur in the sampling circuit.

To overcome these shortcomings, the present invention tends to provide a high precision laser range finder with an automatic peak control loop to mitigate and obviate the aforementioned problems.

SUMMARY OF INVENTION

The object of the present invention is to provide a high precision laser range finder with an automatic peak control loop for stabilizing the peak amplitude of a received laser pulse signal from a target without incurring influence by different reflectivity of the different targets so as to increase measurement precision.

Other objects, advantages, and novel features of the invention will become more apparent from the following detailed description when taken in conjunction with the attached drawings.

DETAILED DESCRIPTION OF THE PREFERRED EMBODIMENT

Figure 1:
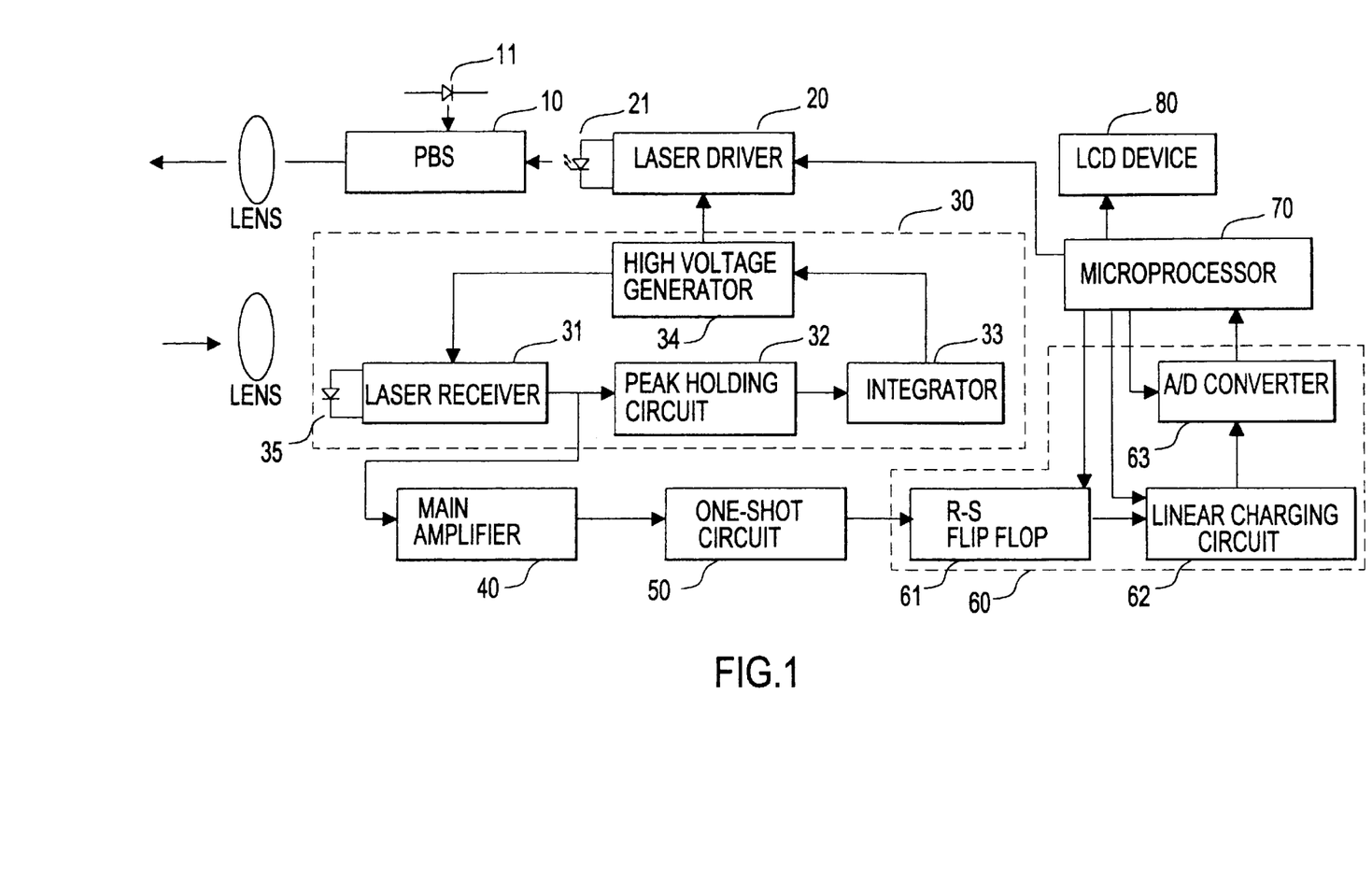
FIG. 1 is a circuit block diagram of a first embodiment of a high precision laser range finder with an automatic peak control loop in accordance with the present invention.

With reference to FIG. 1, a circuit block diagram of a high precision laser range finder in accordance with the present invention is shown. The high precision laser range finder mainly comprises a polarization beam splitter (PBS) (10), a laser driver (20) connected to the PBS (10), an automatic peak control (APC) loop (30) connected to the laser driver (20), a main amplifier (40) connected to the APC loop (30), a one-shot circuit (50) connected to the main amplifier (40), a time to amplitude converting circuit (60) connected to the one-shot circuit (50), a microprocessor (70) connected to the laser driver (20), the time to amplitude converter circuit (60) and a liquid crystal display (LCD) device (80). A red light laser diode (11) is used for aiming at a target and an infrared pulse laser diode (21) connected to the laser driver (20) is used for emitting a laser pulse signal to range distance of a target.

The APC loop (30) comprises an avalanche photo-detector (APD) (35), a laser receiver (31) connected to the photo-detector (35), a peak holding circuit (32) connected to the laser receiver (31), an integrator (33) connected to the peak holding circuit (32), and a high voltage generator (34) connected to the integrator (33), the laser driver (20) and the laser receiver (31).

Figure 2:
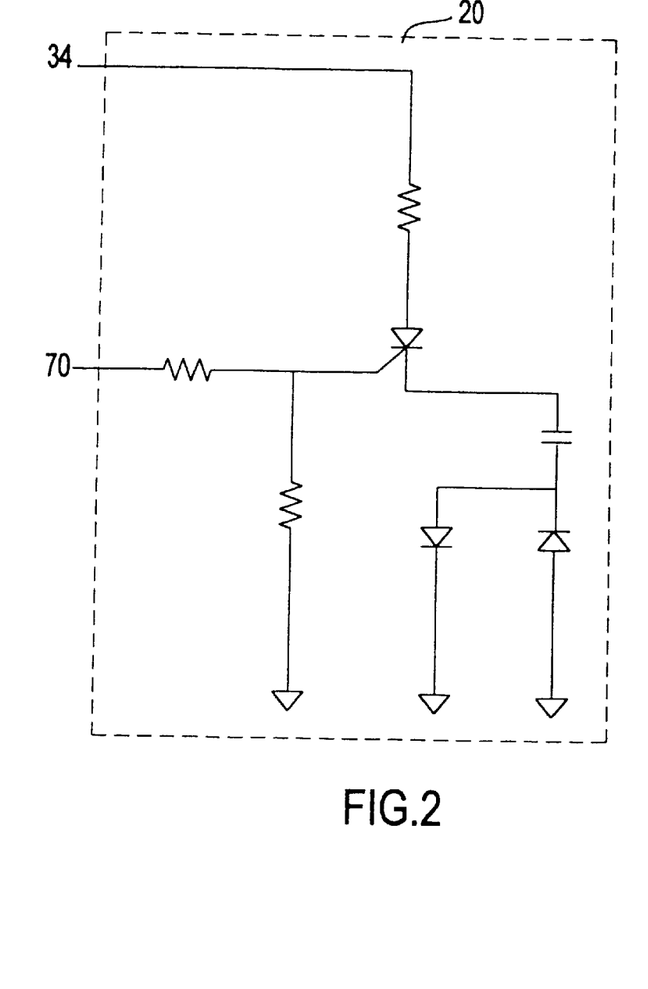
FIG. 2 is a circuit diagram showing a laser driver in accordance with the present invention.

With reference to FIG. 2, the laser driver (20) receives a high voltage provided by the high voltage generator (34) and a trigger signal from the microprocessor (70) to drive the infrared pulse laser diode to emit the laser pulse signal at an appropriate timing.

The main function of the APC loop (30) is described below.

When a received laser pulse signal is reflected from a target, the APD detector (35) converts the received laser pulse signal to a current signal. The current signal is accepted by the laser receiver (31) and converted to a voltage signal. The voltage signal is inputted to the peak holding circuit (32). The peak holding circuit (32) is used for detecting the peak amplitude of the received voltage signal strength. The integrator (33) receives an output signal from the peak holding circuit (32) and compares with a reference voltage (Vref, shown in FIG. 5) to obtain a difference voltage value. The integrator (33) integrates the difference voltage value to output an adjust signal. The adjust signal is employed to adjust the output voltage of the high voltage generator (34) so as to form the APC loop (30). The high voltage generator (34) is used for generating the high voltage to control the strength of the emitted laser pulse signal from the infrared pulse laser diode (21) and the gain of the APD detector (35). When the APC loop (30) functions well, the difference voltage value at the integrator (33) is kept at zero.

Figure 3:
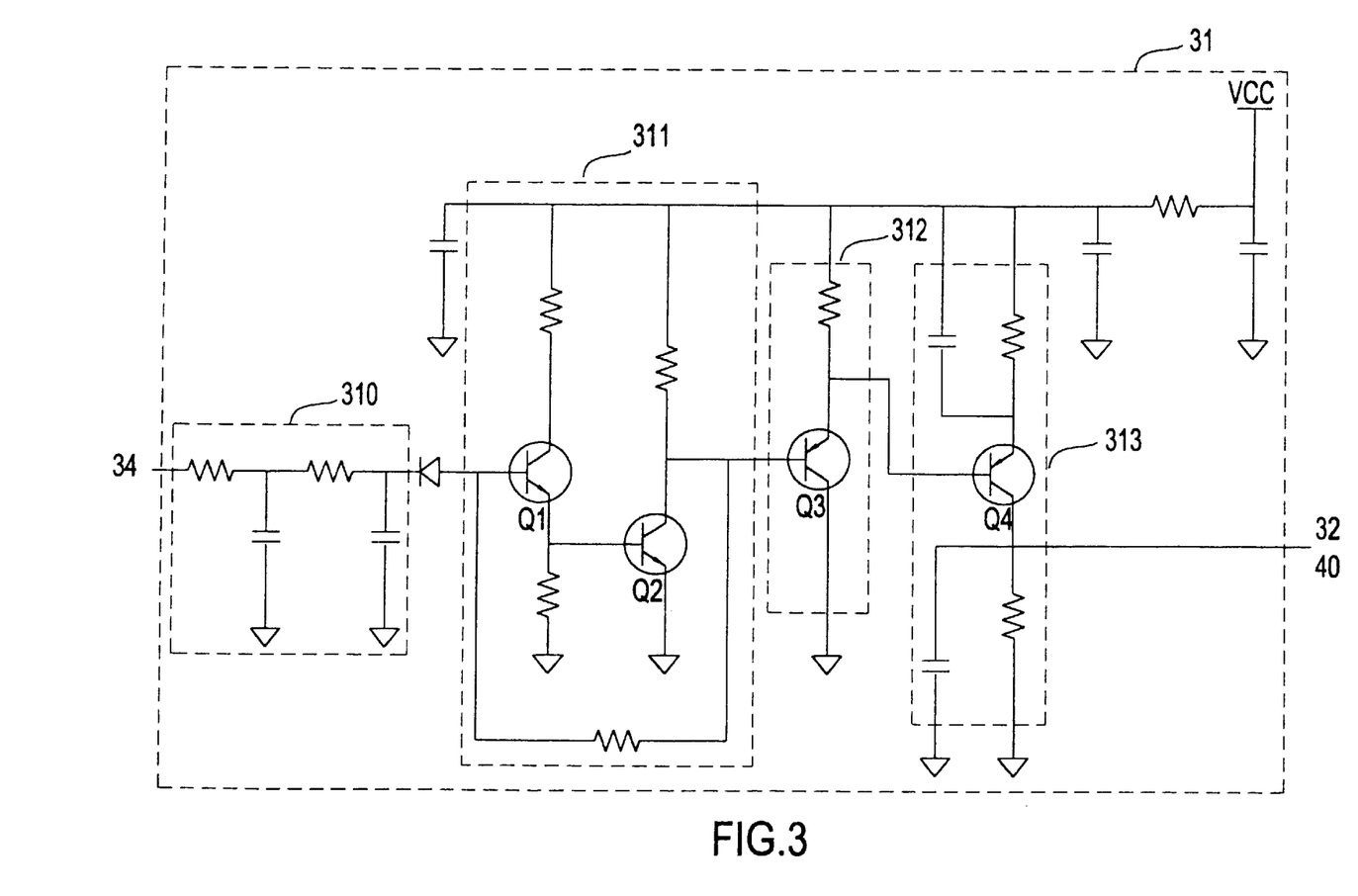
FIG. 3 is a circuit diagram showing a laser receiver in accordance with the present invention.

With reference to FIG. 3, a detailed circuit diagram of the laser receiver (31) is illustrated. The laser receiver (31) comprises a decoupling filter (310), a trans-impedance amplifier (311), an emitter follower (312) and a common emitter amplifier (313). The decoupling filter (310) is set for receiving the output current signal from the APD detector (35). The trans-impedance amplifier (311) connected to the decoupling filter (310) is employed for converting the current signal into the voltage signal. The emitter follower (312) connected to the trans-impedance amplifier (311) and the common emitter amplifier (313) connected to the emitter follower (312) are set to amplify the voltage signal outputted from the trans-impedance amplifier(311). The amplified voltage signal from the laser receiver (31) is transmitted to the main amplifier (40) and the peak holding circuit (32).

Figure 4:
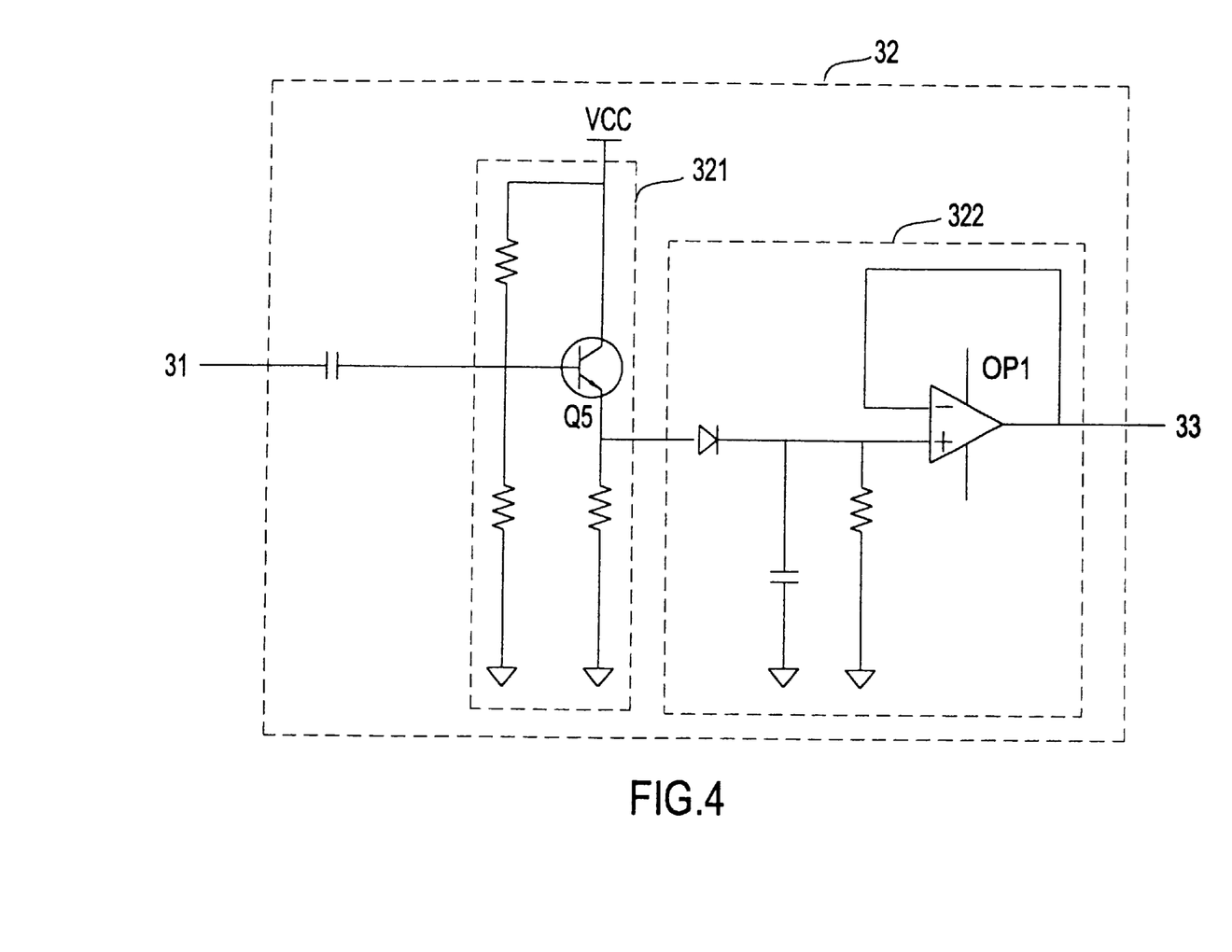
FIG. 4 is a circuit diagram showing a peak holding circuit in accordance with the present invention.

With reference to FIG. 4, the peak holding circuit (32) comprises a buffer circuit (321) connected to the laser receiver (31) and a peak keeping circuit (322) connected to the buffer circuit (321). The peak holding circuit (32) is set to hold the peak strength of the voltage signal outputted from the laser receiver (31) and outputs a proportional voltage signal.

Figure 5:
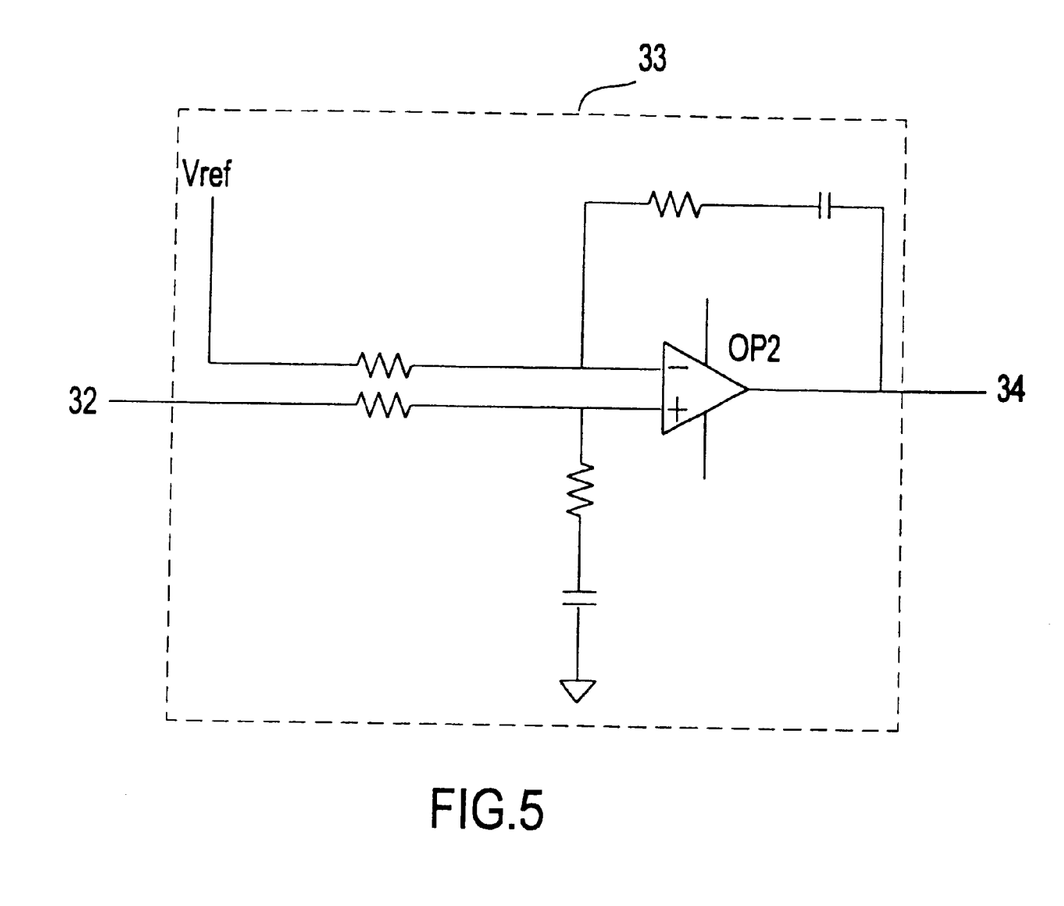
FIG. 5 is a circuit diagram showing an integrator in accordance with the present invention.

With reference to FIG. 5, the integrator (33) receives the proportional voltage signal from the peak holding circuit (32) and compares with the reference voltage (Vref) to obtain the difference voltage value. The difference voltage value is amplified and integrated by the integrator (33) to eliminate the steady error of the APC loop (30).

Figure 6:
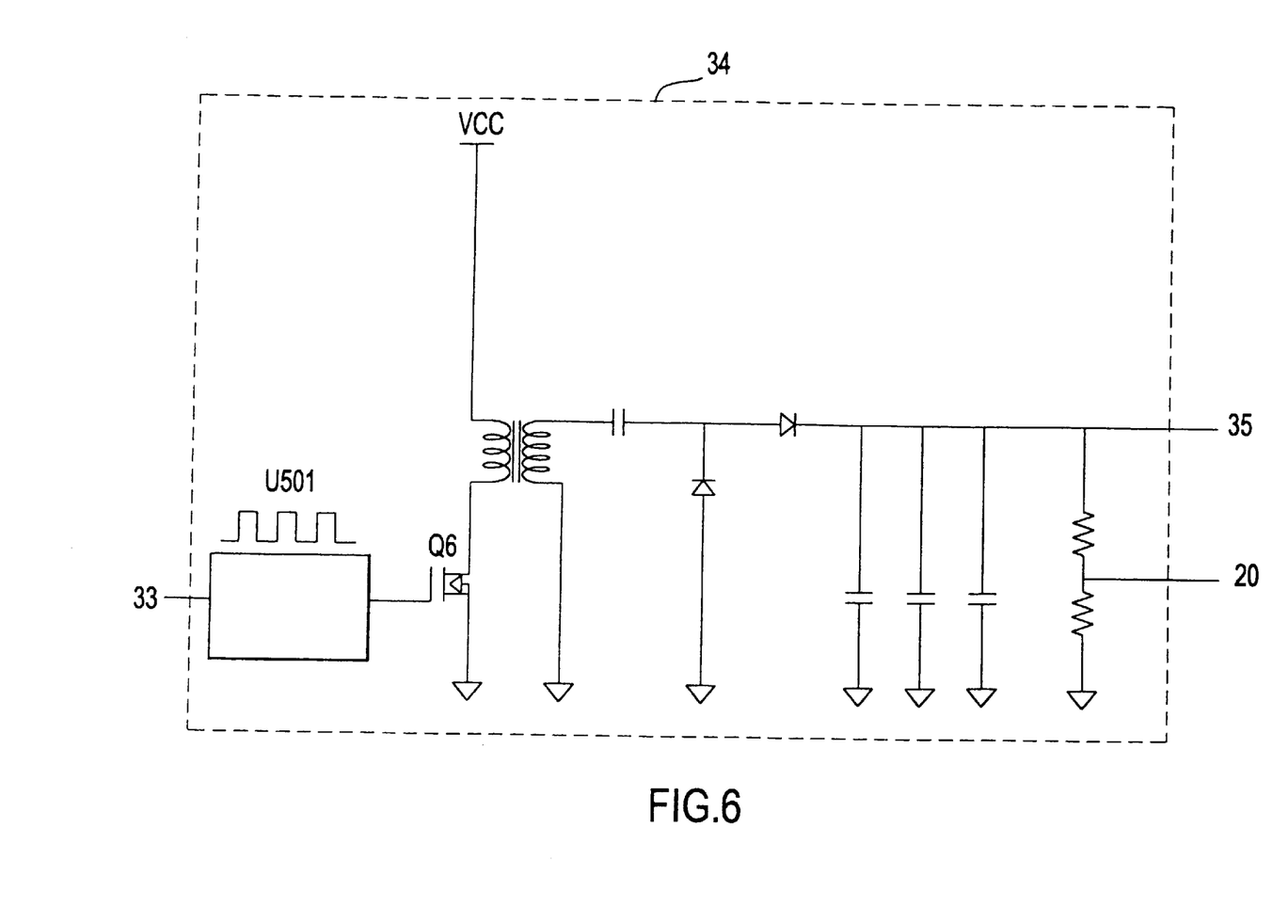
FIG. 6 is a circuit diagram showing a high voltage generator in accordance with the present invention.

With reference FIG. 6, the high voltage generator (34) comprises a pulse width modulator (U501). An output pulse width of the pulse width modulator (341) is controlled by the inputted voltage signal from the integrator (33). The outputted high voltage from the high voltage generator (34) is applied to control the laser driver (20) so as to decide the strength of the emitted laser pulse signal from the infrared pulse laser diode (21). The outputted high voltage is also applied to control the gain of the APD detector (35).

Figure 7:
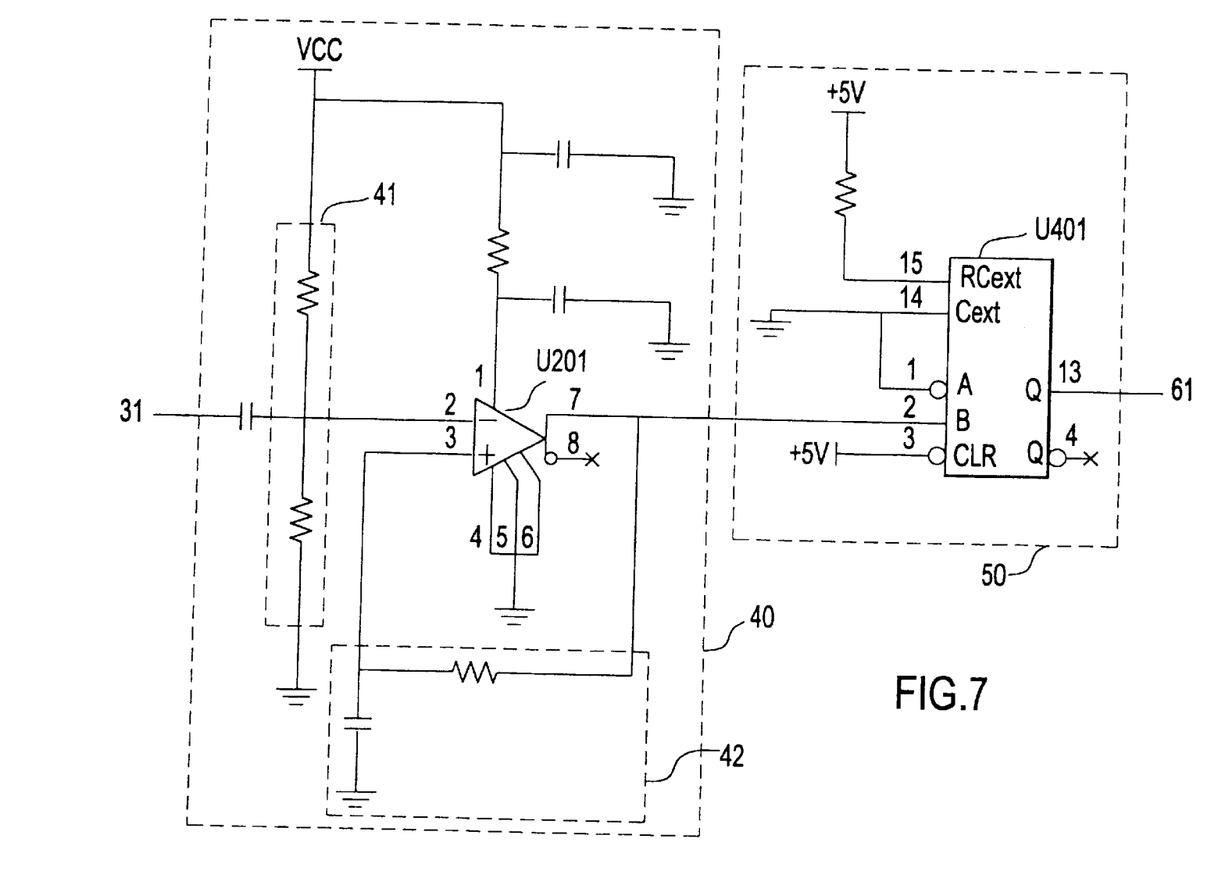
FIG. 7 is a circuit diagram showing a main amplifier and a one-shot circuit in accordance with the present invention.

With reference to FIG. 7, the main amplifier (40) mainly comprises a bias stabilization circuit (41), an amplifier (U201) and a low pass filter (42). The bias stabilization circuit (41) receives the voltage signal outputted from the laser receiver (31) and supplies a stable bias to the amplifier (U201). The low pass filter (42) is provided to stabilize a direct current bias (DC bias) of the amplifier (U201), thus the DC bias is not affected by temperature variation.

Still referring to FIG. 7, the one-shot circuit (50) mainly comprises an integrated circuit (U401), which is connected to the main amplifier (40). The one-shot circuit (50) is used in shaping the output voltage signal sent out by the main amplifier (40) such that the voltage signal is shaped as a time pulse having a predetermined width.

Figure 8:
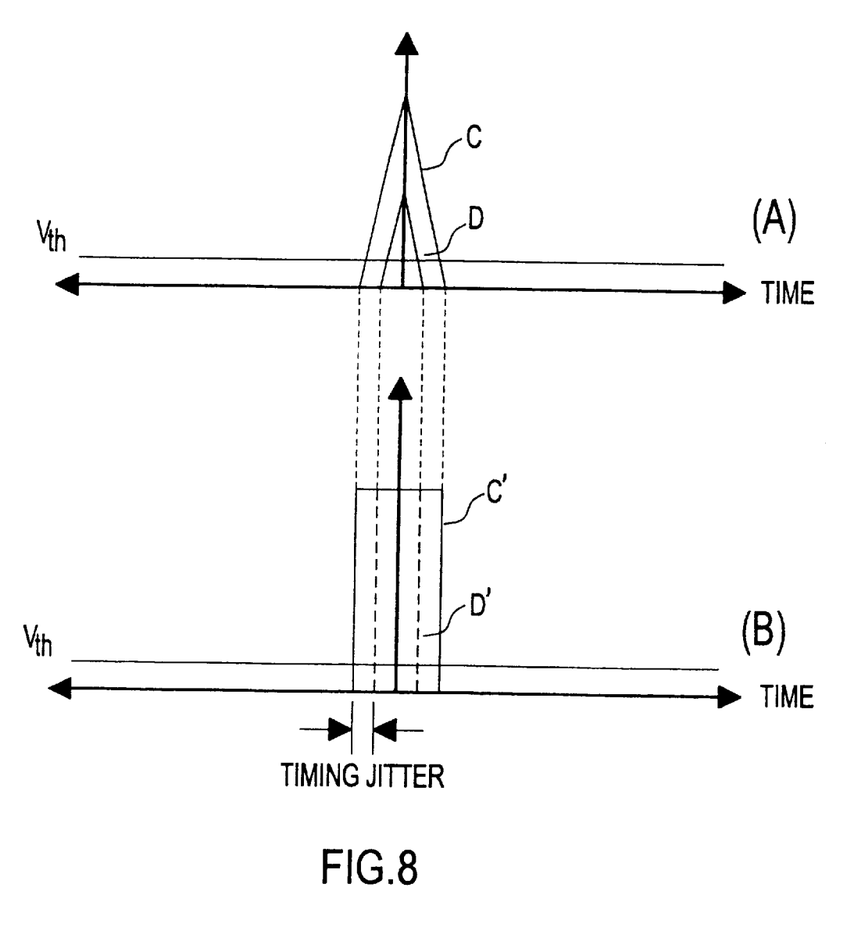
FIGS. 8A and 8B respectively show output waveforms of the main amplifier and the one-shot circuit in accordance with the present invention.

FIG. 8A shows output signals of the main amplifier (40), wherein the C curve represents a reflected signal from a high reflectivity target, and the D curve. represents a reflected signal from a low reflectivity target. Even for the same distance, the received signal strength is different because of the different reflectivity of targets, and thus a timing jitter problem occurs.

FIG. 8B shows output signals of the one-shot circuit (50), wherein the C' and D' curves respective represent the C signal and D signal shown in FIG. 8A being processed by the one-shot circuit (50). The output signal width are the same after processed by the APC loop(30), and thus the timing jitter problem is solved.

Still referring to FIG. 1, the time to amplitude converting circuit (60) comprises an R-S flip flop (61), a linear charging circuit (62) and an first A/D converter (63) (analog to digital converter). The R-S flip flop is connected to the one-shot circuit (50) and the microprocessor (70). The linear charging circuit (62) is connected to the R-S flip flop (61) and the microprocessor (70). The first A/D converter (63) is connected to the linear charging circuit (62) and the microprocessor (70).

Figure 9:
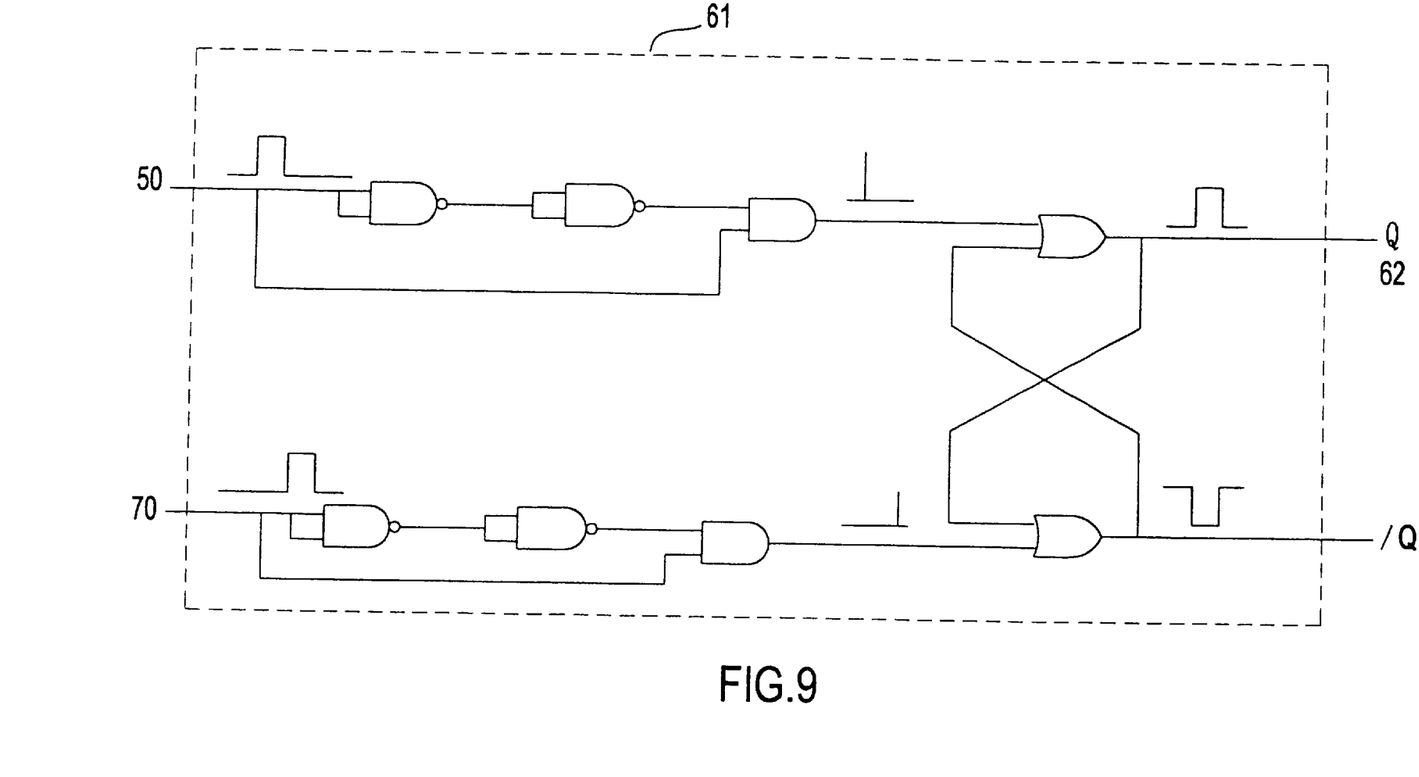
FIG. 9 is a circuit diagram showing an R-S flip flop in accordance with the present invention.

With reference to FIG. 9, the R-S flip flop (61) receives the time pulse outputted from the one-shot circuit (50) and the trigger signal from the microprocessor (70) for generating a trigger pulse from a non-inverting output terminal, wherein the width of the trigger pulse is proportional to the time delay between the emitted laser pulse signal and the received laser pulse signal.

Figure 10:
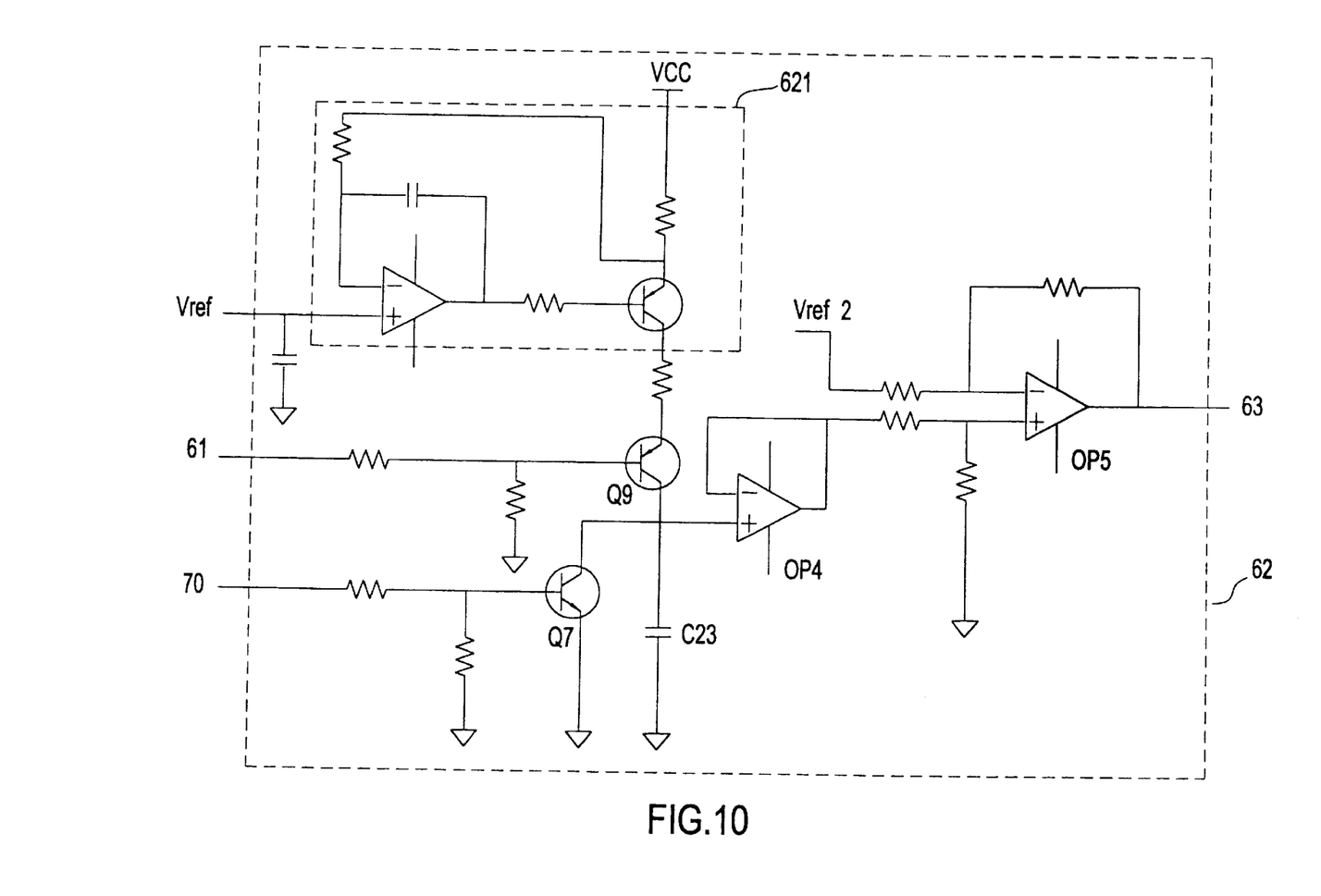
FIG. 10 is a circuit diagram showing a linear charging circuit in accordance with the present invention.

With reference to FIG. 10, the linear charging circuit (62) comprises a constant current source (621), a transistor Q9 and a capacitor C23, wherein the transistor Q9 is used as a switch. The transistor Q9 is controlled by the trigger pulse outputted from the R-S flip flop (61) to be turned on or off. When the transistor Q9 is turned on, a constant current from the constant current source (621) passes through the transistor Q9 to charge the capacitor C23. Thus the width of the trigger pulse is obtained according to a charging voltage of the capacitor C23. The charging voltage is outputted from an operation amplifier OP5 through a buffer OP4.

The first A/D converter (63) converts the charging voltage from the linear charging circuit (62) into a digital value and transfers the digital value to the microprocessor (70). The microprocessor (70) calculates a distance value of the target according to the digital value outputted from the first A/D converter (63). The distance value is displayed on the LCD device (80).

After the microprocessor (70) receives the digital value from the first A/D converter (63), a reset signal is immediately outputted to the linear charging circuit (62) for discharging the capacitor C23.

Figure 11:
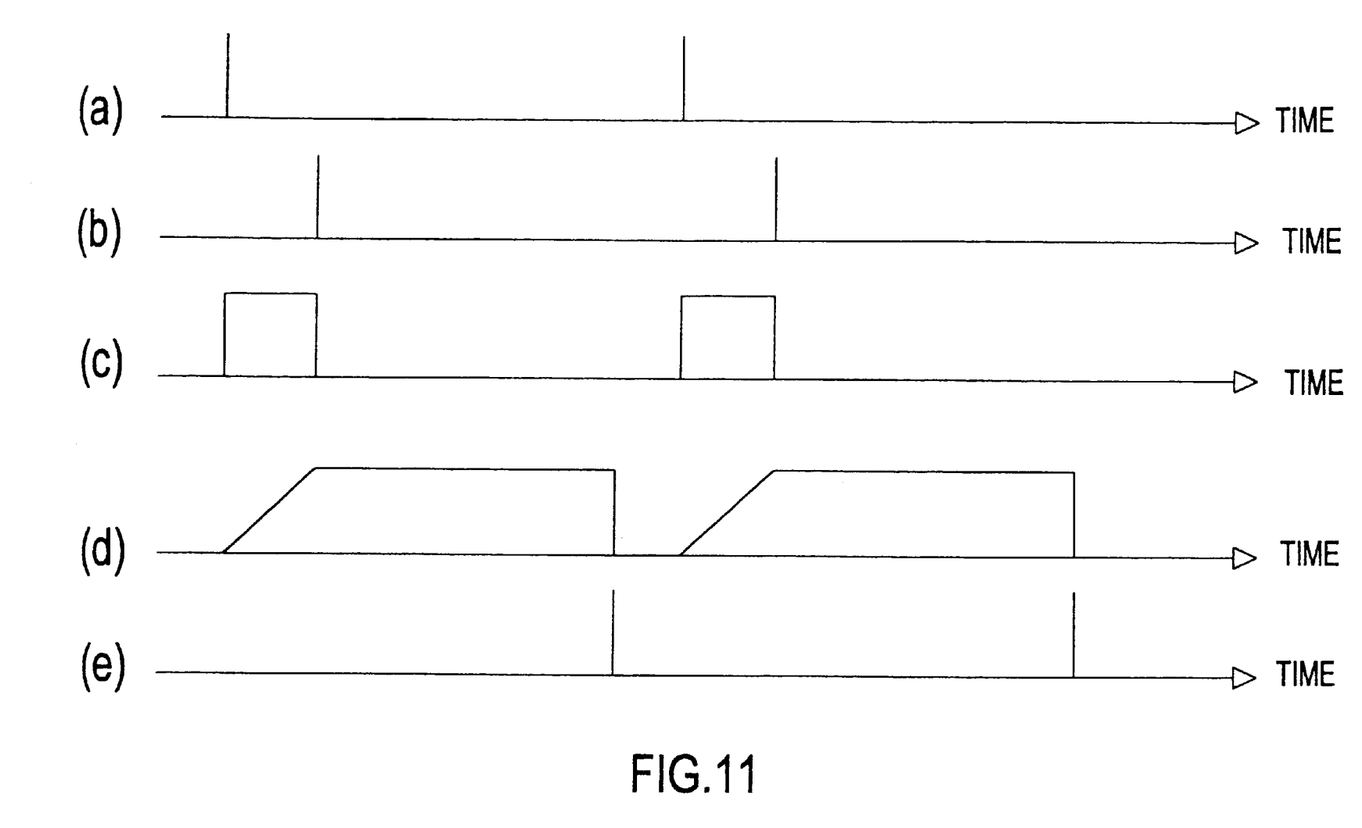
FIG. 11 is a timing diagram of the high precision laser range finder in accordance with the present invention.

With reference to FIG. 11, a timing diagram of the high precision laser range finder in accordance with the present invention is shown. In this timing diagram, (A) represents the emitted laser pulse signal, (B) represents the received laser pulse signal, (C) represents the output from the R-S flip flop (61), (D) represents the charging voltage of the capacitor C23 in the linear charging circuit (62) and (E) represents the reset signal from the microprocessor (70).

Figure 12:
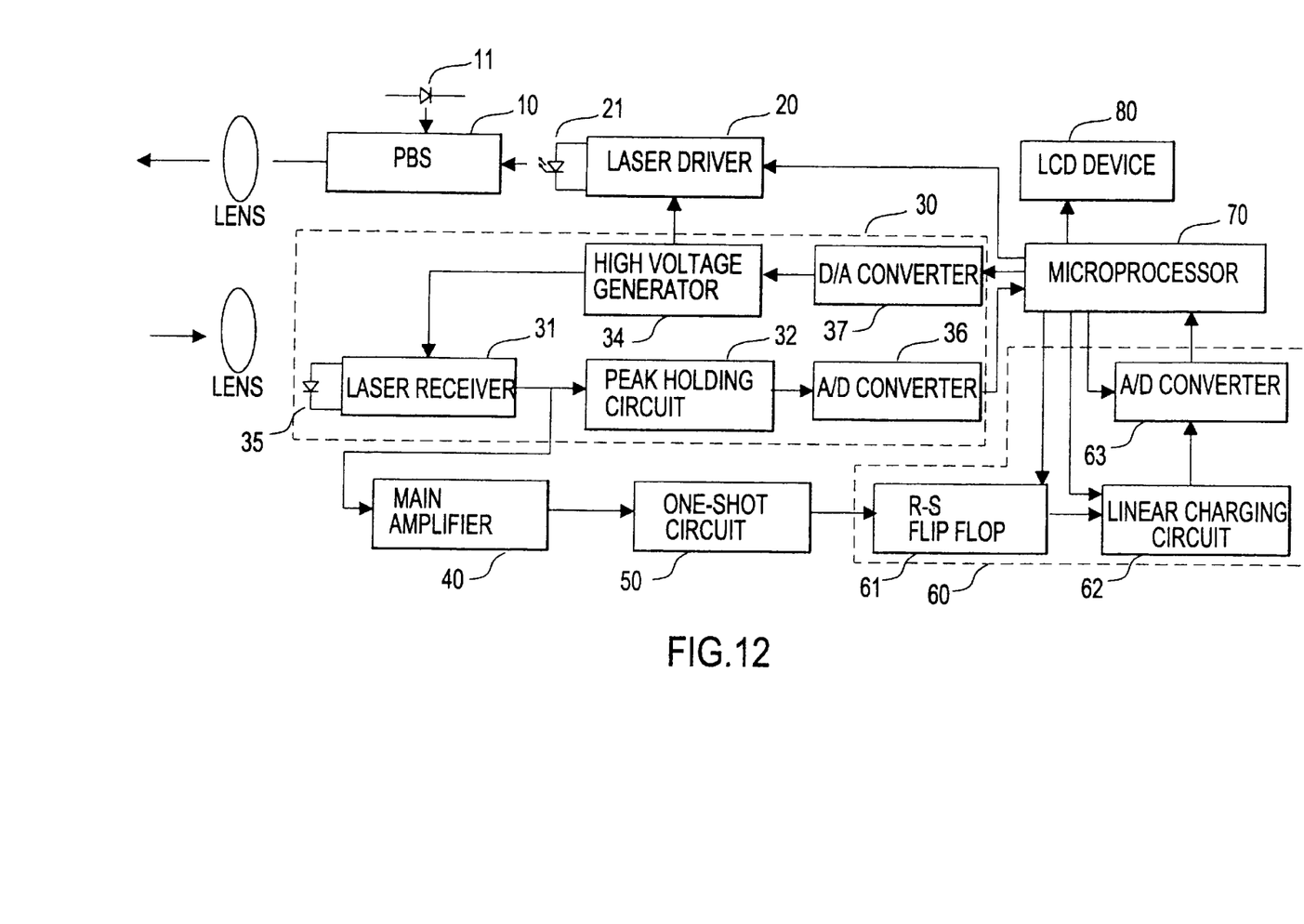
FIG. 12 is a circuit block diagram of a second embodiment of a high precision laser range finder with an automatic peak control loop in accordance with the present invention, wherein the integrator is replaced by an A/D converter and a D/A converter.

With reference to FIG. 12, a second embodiment of the high precision laser range finder is shown, wherein the integrator (33) of the APC loop (30) is replaced by a second A/D converter (36) and a D/A converter (37) (digital to analog converter). The A/D converter (36) is connected to the peak holding circuit (32) and the microprocessor (70) for converting the output signal from the peak holding circuit (32) into a digital signal to the microprocessor (70).

The microprocessor (70) receives the digital signal and compares with a default value that is set in the microprocessor (70) so as to adjust the strength of the digital signal. The adjusted digital signal by the microprocessor (70) is outputted to the DIA converter (37). The adjusted digital signal is converted into an analog signal and transfers to the high voltage generator (34).

Although the present invention has been explained in relation to its preferred embodiment, it is to be understood that many other possible modifications and variations can be made without departing from the spirit and scope of the invention as hereinafter claimed.

What is claimed is:

1. A laser range finder comprising:
   a laser driver connected to an infrared pulse laser diode for driving the infrared pulse laser diode to fire a laser pulse signal to a target;
   an automatic peak control loop connected to the laser driver for receiving a reflected laser pulse signal from the target and controlling the laser driver so as to decide the strength of the emitted laser pulse signal, wherein the automatic peak loop control loop comprises:
      an avalanche photo-detector for receiving the reflected laser pulse signal from the target and converting the reflected laser pulse signal to a current signal;
      a laser receiver connected to the avalanche photo-detector for receiving the current signal from the avalanche photo-detector and converting the current signal to a voltage signal;
      a peak holding circuit connected to the laser receiver for detecting a peak amplitude strength of the voltage signal received from the laser receiver;
      an integrator connected to the peak holding circuit for receiving an output voltage signal from the peak holding circuit and comparing the output voltage signal to a reference voltage to obtain a difference voltage value and integrating the difference voltage value; and
      a high-voltage generator connected to the integrator, the laser driver and the laser receiver for receiving the output signal from the integrator to control the strength of the emitted laser pulse signal of the laser driver and the grain of the avalanche photo-detector;
   a main amplifier connected to the automatic peak control loop for amplifying the reflected laser pulse signal and outputting an amplified voltage signal;
   a one-shot circuit connected to the main amplifier for converting the amplified voltage signal to a time pulse relating to a distance to the target;
   a time to amplitude converting circuit connected to the output of the one-shot circuit for receiving the time pulse from the one-shot circuit and outputting a digital signal according to the time pulse;
   a microprocessor connected to the time to amplitude converting circuit and laser driver for controlling the laser driver to emit laser pulses and providing the reset signal for the time to amplitude converting circuit; and
   a liquid crystal display device connected to the microprocessor for displaying the distance value calculated by the microprocessor.

2. The laser ranger finder as claimed in claim 1, wherein the time to amplitude converting circuit comprises:
   a flip flop connected to the one-shot circuit and the microprocessor for receiving the digital pulse from the one-shot circuit and outputting a trigger pulse;
   a linear charging circuit connected to the flip flop for outputting a charging voltage according to the trigger pulse from the flip flop; and
   a second A/D converter connected to the linear charging circuit and the microprocessor for receiving the charging voltage from the linear charging circuit and converting the charging voltage into the digital value and transferring the digital value to the microprocessor.

3. The laser range finder as claimed in claim 2, wherein a polarization beam splitter is used for providing a beam-spotlighting process to the emitted laser pulse signal.

4. The laser range finder as claimed in claim 3, wherein the flip flop is an R-S flip flop.

5. A laser range finder comprising:
   a laser driver connected to an infrared pulse laser diode for driving the infrared pulse laser diode to fire a laser pulse signal to a target;
   an automatic peak control loop connected to the laser driver for receiving a reflected laser pulse signal from the target and controlling the laser driver so as to decide the strength of the emitted laser pulse signal, wherein the automatic peak control loop comprises:
      an avalanche photo-detector for receiving the reflected laser pulse signal from the target and converting the reflected laser pulse signal to a current signal;
      a laser receiver connected to the avalanche photo-detector for receiving the current signal from the avalanche photo-detector and converting the current signal to a voltage signal;
      a peak holding circuit connected to the laser receiver for detecting a peak amplitude strength of the voltage signal received from the laser receiver;
      an integrator connected to the peak holding circuit for receiving an output voltage signal from the peak holding circuit and comparing the output voltage signal to a reference voltage to obtain a difference voltage value and integrating the difference voltage value; and
      a high voltage generator connected to the D/A converter, where the high voltage generator receives the analog signal from the D/A converter to control the strength of the emitted laser pulse signal of the laser driver and the gain of the avalanche photo-detector;
   a main amplifier connected to the automatic peak control loop for amplifying the reflected laser pulse signal and outputting an amplified voltage signal;
   a one-shot circuit connected to the main amplifier for converting the amplified voltage signal to a time pulse relating to a distance to the target;

a time to amplitude converting circuit connected to the output of the one-shot circuit for receiving the time pulse from the one-shot circuit and outputting a digital signal according to the time pulse;

a microprocessor connected to the time to amplitude converting circuit and laser driver for controlling the laser driver to emit laser pulses and providing the reset signal for the time to amplitude converting circuit; and a liquid crystal display device connected to the microprocessor for displaying the distance value calculated by the microprocessor.

6. The laser range finder as claimed in claim 5, wherein the time to amplitude converting circuit comprises:

a flip flop connected to the one-shot circuit and the microprocessor for receiving the digital pulse from the one-shot circuit and outputting a trigger pulse;

a linear charging circuit connected to the flip flop for outputting a charging voltage according to the trigger pulse from the flip flop; and a second A/D converter connected to the linear charging circuit and the microprocessor for receiving the charging voltage from the linear charging circuit and converting the charging voltage into the digital value and transferring the digital value to the microprocessor.

7. The laser range finder as claimed in claim 6, wherein a polarization beam splitter is used for providing a beam-spotlighting process to the emitted laser pulse signal.

8. The laser range finder as claimed in claim 7, wherein the flip flop is an R-S flip flop.

* * * * *